United States Patent [19]

Weber et al.

[11] 4,060,375
[45] Nov. 29, 1977

[54] METHODS AND APPARATUS FOR THE HEAT TREATMENT OF FINE-GRAINED MATERIALS

[75] Inventors: Paul Weber, Oelde; Hans Möllenkopf; Kurt Henning, both of Neubeckum; Otto Heinemann, Ennigerloh; Heinz-Herbert Schmits, Rheda; Wolfgang Rother, Stromberg; Horst Ritzmann, Enniger; Jürgen Wurr, Enniger; Karl Krützner, Jr., Neubeckum; Werner Schössler, Ahlen; Wolf Goldmann; Georg Schepers, both of Enniger, all of Germany

[73] Assignee: Polysius AG, Neubeckum, Germany

[21] Appl. No.: 648,271

[22] Filed: Jan. 12, 1976

Related U.S. Application Data

[62] Division of Ser. No. 469,358, May 13, 1974, Pat. No. 3,940,236.

[51] Int. Cl.$^2$ ............................................. F27B 15/00
[52] U.S. Cl. ......................................... 432/14; 432/58; 432/106
[58] Field of Search ..................... 432/14, 15, 58, 106; 34/57 R, 10

[56] References Cited

U.S. PATENT DOCUMENTS

| | | | |
|---|---|---|---|
| 2,621,034 | 12/1952 | Stecker | 432/58 |
| 3,834,860 | 9/1974 | Fukuda et al. | 432/15 |
| 3,904,353 | 9/1975 | Bosshard et al. | 432/106 |
| 3,940,236 | 2/1976 | Weber et al. | 432/14 |

Primary Examiner—John J. Camby
Attorney, Agent, or Firm—Learman & McCulloch

[57] ABSTRACT

Fine-grained material such as raw ground cement adapted to be fired in a rotary tube furnace is introduced to a vertical preheater and falls through a heating zone located at a level below the level at which the material enters the preheater. A stream of air enters the preheater at a level below the heating zone and passes upwardly at sufficient velocity to entrain the material that has passed through the heating zone, thereby causing such material to pass again through the heating zone. From the preheater the material is delivered to the furnace for final firing.

14 Claims, 4 Drawing Figures

METHODS AND APPARATUS FOR THE HEAT TREATMENT OF FINE-GRAINED MATERIALS

RELATED APPLICATION

This application is a division of application Ser. No. 469,358, filed May 13, 1974, now U.S. Pat. No. 3,940,236.

This invention relates to the heat-treatment of fine-grained material such as raw ground cement, which is preheated in a preheater with the hot exhaust gases from a rotary tube furnace, heated and then finally fired in the rotary tube furnace.

In the manufacture of cement, clay, lime, magnesite, dolomite and the like, the heat treatment of the fine-grained material is frequently effected by first preheating the material in a preheater consisting of several cyclones, using the hot exhaust gases from a rotary tube furnace, before it is then finally fired or sintered in the rotary tube furnace. In this case the greater part of the heating must be effected in the rotary tube furnace, while only a lesser part of the total heat energy is supplied to the material in the pre-heater. This distribution of the heating effect between the preheater and the rotary tube furnace is not optimal from the capital cost aspect, since the specific capital costs of the rotary tube furnace are relatively high.

In order to be able to make the rotary tube furnace with smaller dimensions in cross-section and/or length, attempts have hitherto been made to dispose a prefiring zone between the preheater and the rotary tube furnace, wherein the preheated material is heated as high as possible (though without passing from the condition of powdered free-flowing solid to that of reduced fluidity due to the incipient grain coarsening and possibly melt-phase formation). The special problem in designing a prefiring zone of this type is that extremely uniform feed of fuel to the material is necessary in order to avoid excessive firing of individual particles of material (with all the associated difficulties such as caking, agglomerate formation, etc.).

In one known method this prefiring zone is formed by a whirl chamber directly heated by burners, and from which the material passes into the rotary tube furnace. Another known method uses a burner chamber with the material and fuel entering and leaving tangentially. The disadvantage of these known methods lies in the high capital costs of the prefiring zone which causes a considerable fraction of the savings made possible in the rotary tube furnace to be lost again.

The invention is based on the avoidance of these disadvantages by the provision of a method of the type initially described wherein the desired uniform heat-treatment of the material in the prefiring zone is made possible with very low expenditure on equipment.

According to the invention this objective is achieved in that in a pipe, along which furnace exhaust gases flow in a generally vertical direction from below upward, between the rotary tube furnace and the preheater, a firing zone extending over substantially the entire cross-section of said pipe is produced at a level such that at least a substantial part of the material passes through said firing zone more than once.

In the method according to the invention, the gas pipe which is in any case present between the rotary tube furnace and the preheater is used as a firing chamber, so that no appreciable extra capital costs arise from this firing zone. On the other hand the transfer of a considerable part of the heat transmission into this firing zone enables the rotary tube furnace to be made substantially smaller.

Of particular importance in the method provided by the invention is the position of the firing zone in the said gas pipe. Since in this gas pipe the particles of material move partly with the gases and partly in counter-flow, and depending on the construction of the preheater, partly undergo a reversal of their direction of movement (as with a preheater comprising cyclones and whirl chambers) and partly perform an up-and-down cyclonic movement (as with a counterflow shaft provided with cross-section constrictions), the firing zone can be disposed in such manner that at least an appreciable part of the material passes through the firing zone more than once. In this way a particularly intensive transfer of heat from fuel to material is achieved in the firing zone.

The oxygen concentration in the gases supplied to the firing zone should be between 5 and 14%, and preferably between 8 and 12%. In this case the oxygen concentration in the rotary tube furnace exhaust gas is preferably set to at least 2.5% (i.e., above the usual oxygen content), so that only the additionally needed amount of oxygen has to be supplied to the firing zone from another source (for instance the cooler outlet air). The entire amount of oxygen needed can also be supplied via the exhaust gases from the rotary tube furnace.

Numerous further features of the invention will be described below in reference to the description of two embodiments in the drawings, wherein.

Figure 1:
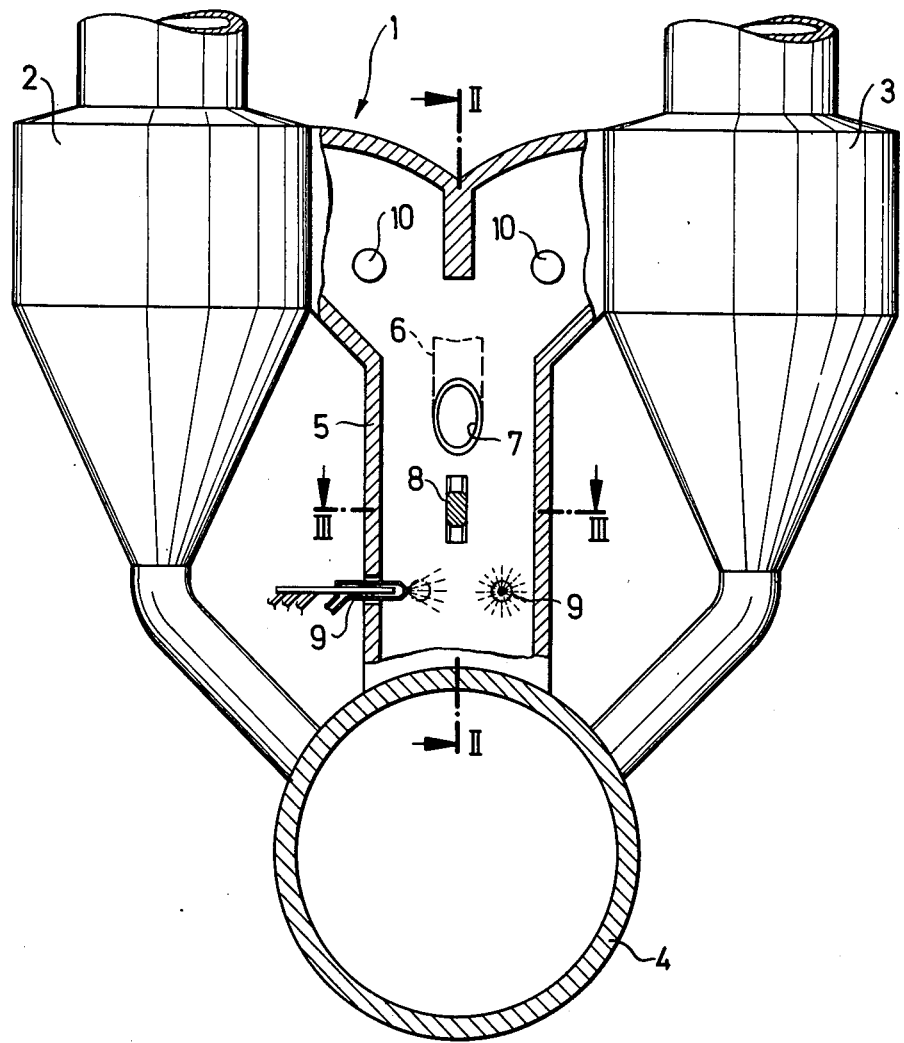
FIG. 1 is a vertical section through the main parts of apparatus for carrying out the method of the invention.
Figure 3:
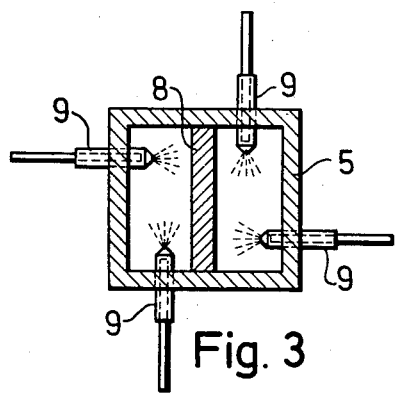
FIG. 3 is a section on the line III-III of FIG. 1.
Figure 2:
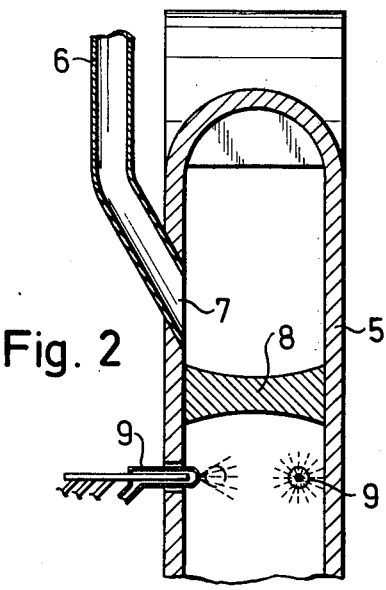
FIG. 2 is a section along the line II-II of FIG. 1.

The apparatus shown in part in FIGS. 1-3 comprises a preheater 1 formed of a number of cyclones and whirl chambers superimposed at different levels, only the two cyclones 2, 3 of the lowest level being shown in FIG. 1. The apparatus also includes a rotary tube furnace 4 whose exhaust gases flow to the two cyclones 2, 3 via a gas pipe 5.

Material is injected into the gas pipe 5 through a feed pipe 6 which comes from a central whirl chamber in the next higher level. A bridge-shaped distributor member 8 is located in the gas pipe 5 below the feed aperture 7.

In order to produce a generally horizontal firing zone, in accordance with the invention there are now disposed below this distributor member 8 a number of fuel jets 9 which feed finely divided liquid or gaseous fuel into the gas pipe 5. In the embodiment shown, see especially FIG. 3, the fuel jets 9 are so disposed and directed that the fuel is fed into the gas pipe 5 in the form of a horizontal rotary flow (clockwise in FIG. 3).

If necessary, additional burners 10 are also provided above the mouth of the feed pipe 6 as a safeguard in cases of breakdown.

The apparatus operates as follows:

After being well-heated in the individual stages of the cyclone preheater, the material passes through the feed pipe 6 and the aperture 7 into the gas pipe 5. On meeting the distributor member 8 the flow of material is broken up. However, under the influence of its kinetic energy a large proportion of the material first drops somewhat further down in the gas pipe 5, and during its falling movement passes through the firing zone which is formed over the whole cross-section of the gas pipe 5 in the vicinity of the fuel jets 9. The material is then deflected by the exhaust gases from the rotary tube furnace 4 as they move from the bottom of the gas pipe 5 upward, the velocity of the gases being sufficient to entrain the material. Thus it passes a second time, though now in the upward direction, through the firing zone at the level of the fuel jets 9, and in this manner is again strongly heated. But since the fuel is fed into the area of this firing zone in very fine distribution, avoiding the formation of intense flames, the fine-grained material is heated very uniformly and localized overheating is avoided.

The material now highly heated in this manner passes with the gases into cyclones 2 and 3 where it is separated in known manner and fed to the rotary tube furnace 4 where it is finally fired.

As already stated, an important part of the oxygen needed for combustion in the said firing zone is made available by suitable adjustment of the residual oxygen content in the exhaust gases from the rotary tube furnace. In this connection it is advantageous that only an appreciably less heat transfer, as compared with the previous normal mode of operation, has to take place in the furnace itself. The fuel jets 9 can therefore be run with quite a small amount of air.

In order to achieve optimum conditions in the firing zone, it may be beneficial to make the fuel jets 9 adjustable, in a known manner, in the horizontal and vertical directions. The fuel jets can also be provided in a number of superimposed planes, thereby to provide a defined firing zone with uniform firing conditions over the entire cross-section of the gas pipe 5, with a somewhat larger height.

Figure 4:
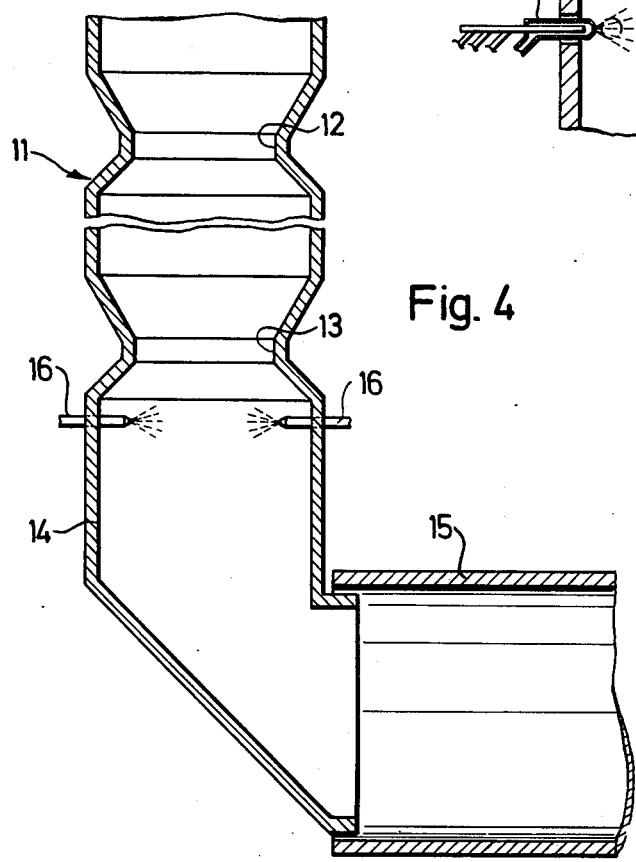
FIG. 4 is a schematic, vertical sectional view of a second embodiment of apparatus for carrying out the method of the invention.

FIG. 4 shows schematically a second embodiment wherein the preheater 5 is replaced by a preheater 11 comprising a vertical counterflow shaft having a number of vertically spaced cross-sectional constrictions (e.g. 12, 13) disposed at intervals one above the other and below the level of the material inlet. Each constriction has an upper surface which slopes downwardly and inwardly toward the center of the shaft. The cross-sectional area of the shaft above and below each constriction is greater than that at the constriction.

The bottom part of this shaft forms a gas pipe 14 which feeds exhaust gases in a whirling movement from the rotary tube furnace 15 to the preheater 11. Below the lowest cross-sectional constriction 13 in this gas pipe are disposed a number of fuel jets 16 which, as in the previously described embodiment, form a preheating zone extending substantially over the entire cross-section of the gas pipe.

With a counterflow shaft of this type, the particles of material at a certain concentration shoot through the uppermost constriction (e.g. 12) and are deflected thereby toward the center of the shaft. The upwardly ascending whirling gas passing the next lower constriction (e.g. 13) is accelerated by an amount sufficient to decelerate particles and entrain them upwardly and outwardly to precipitate them toward the periphery of the chamber between the constrictions 12 and 13. During the precipitation, a good heat transfer from the gas to the particles is obtained. Particles precipitated to the chamber wall then shoot through the constriction 13 and are again directed toward the center of the shaft. The upwardly ascending, whirling gas acts on the particles to slow their downward movement and move them outwardly toward the periphery of the chamber below the constriction 13. Such movement of the particles below the constriction 13 subjects them to the further heating of the prefiring zone defined by the jets 16. From the prefiring zone the particles pass into the furnace 15.

Particles which are entrained in the upwardly moving gas stream are subjected to repeated passes through the preheating zone. In this manner, as with the embodiment described previously, the material which has already been well heated in the preheater 11 is heated further still before it reaches the rotary tube furnace 15.

In a counterflow shaft of the type shown in FIG. 4, the velocity of the gases passing generally vertically through the firing zone is in general something over 7 meters per second, but the velocity of such gases is less than that required to entrain and support substantial quantities of the particles throughout the upward movement of the gases. As a consequence, substantially all of the particles are delivered to the furnace. With an arrangement as in FIGS. 1–3, the gas velocity in the vicinity of the firing zones is however appreciably higher.

What is claimed is:

1. A method for the heat treatment of fine-grained material prior to firing said material in a furnace having a walled, vertical waste gas conduit, said method comprising conducting a waste gas stream from said furnace upwardly through said conduit at a predetermined velocity; supplying fine-grained material having a grain size so related to the velocity of said gas stream that no substantial portion of said material is entrained by said gas stream; introducing said material into said conduit at a first level between its upper and lower ends so that said material will fall downwardly in opposition to said gas stream toward the lower end of said conduit; combusting fuel in said conduit at a second level below said first level to provide a heating zone below the level at which said material is introduced to said conduit; and deflecting downwardly moving material inwardly of said conduit toward the center thereof and at a level above that of said heating zone to assure that said downwardly moving material passes through said heating zone as said material falls toward said lower end of said conduit.

2. A method according to claim 1 including generating heat at said zone by the combustion of fuel in an atmosphere containing oxygen at a concentration of between 5 and 14 percent of said atmosphere.

3. A method according to claim 2 wherein the concentration of oxygen is between 8 and 12 percent.

4. A method according to claim 1 including heating said gas stream prior to its introduction to said conduit.

5. A method according to claim 1 wherein said gas stream contains at least 2.5 percent oxygen.

6. A method according to claim 1 wherein said gas stream has a velocity of at least 7 meters per second.

7. A method according to claim 1 including delivering material from said conduit to a rotary tube furnace.

8. A method according to claim 7 wherein said gas stream is introduced to said conduit directly from said furnace.

9. A method according to claim 1 wherein said gas stream passes upwardly through said conduit with a whirling movement.

10. A method according to claim 1 wherein said gas stream is accelerated following its passage through said heating zone and at the level at which said material is deflected.

11. A method according to claim 1 wherein said material is deflected toward the center of said conduit at a plurality of vertically spaced levels all of which are above the level of said heating zone.

12. Apparatus for the heat treatment of fine-grained material prior to firing said material in a furnace, said apparatus comprising a walled conduit having a substantially vertical portion; inlet means for introducing material at a first level to said conduit such that said material may fall downwardly through said vertical portion; means defining a constriction of said conduit at least at one level below said first level, said conduit having on opposite sides of said constriction a cross-sectional area greater than that of said conduit at said constriction, said constriction sloping downwardly and inwardly toward the center of said conduit; means for combusting fuel at a level below said constriction to provide a heating zone through which said material passing said constriction may fall; and means for delivering a stream of waste furnace gas to said conduit at a level below said heating zone and at such velocity with respect to the grain size of said material that no substantial portion of said material is entrained in said stream, the velocity of said gas stream being sufficient to decelerate a substantial portion of the material which passes downwardly past said constriction and into said heating zone.

13. Apparatus according to claim 12 wherein there are a plurality of said constrictions vertically spaced from one another.

14. Apparatus according to claim 13 wherein said fuel combusting means is located at a level below the lowermost of said constrictions.

* * * * *